United States Patent [19]

Hmelar et al.

[11] Patent Number: 5,729,643
[45] Date of Patent: Mar. 17, 1998

[54] TAPERED COMPOSITE OPTICAL FIBER AND METHOD OF MAKING THE SAME

[75] Inventors: Michael Hmelar, Palo Alto; Ron C. Mehl, Mountain View; Paul Lovato, Sunnyvale, all of Calif.

[73] Assignee: Coherent, Inc., Santa Clara, Calif.

[21] Appl. No.: 855,770

[22] Filed: May 12, 1997

Related U.S. Application Data

[63] Continuation of Ser. No. 628,296, Apr. 5, 1996, abandoned.

[51] Int. Cl.⁶ .................................................. G02B 6/255
[52] U.S. Cl. ............................... 385/43; 385/51; 385/98
[58] Field of Search ......................... 385/43, 51, 95–99

[56] References Cited

U.S. PATENT DOCUMENTS

| | | | |
|---|---|---|---|
| 3,825,319 | 7/1974 | Cook et al. | 385/95 |
| 4,432,807 | 2/1984 | Shirasaka et al. | 134/2 |
| 4,654,532 | 3/1987 | Hirschfeld | 250/458.1 |
| 4,688,884 | 8/1987 | Scifres et al. | 350/96.15 |
| 4,729,621 | 3/1988 | Edelman | 350/96.15 |
| 4,820,010 | 4/1989 | Scifres et al. | 350/96.015 |
| 4,877,300 | 10/1989 | Newhouse et al. | 350/96.15 |
| 4,900,114 | 2/1990 | Mortimore et al. | 385/96 |
| 4,930,859 | 6/1990 | Hoffman, III | 350/96.21 |
| 4,983,014 | 1/1991 | Nattermann | 350/96.24 |
| 5,022,043 | 6/1991 | Jacobs | 372/95 |
| 5,058,978 | 10/1991 | Kondoh et al. | 385/43 |
| 5,222,171 | 6/1993 | Straus | 385/96 |
| 5,301,252 | 4/1994 | Yanagawa et al. | 385/96 |
| 5,309,536 | 5/1994 | Suganuma et al. | 305/43 |
| 5,371,816 | 12/1994 | Pan | 385/33 |
| 5,394,492 | 2/1995 | Hwang | 385/33 |
| 5,420,948 | 5/1995 | Byron | 385/43 |
| 5,438,873 | 8/1995 | Wlodarczyk et al. | 73/705 |
| 5,511,141 | 4/1996 | Peli | 385/116 |
| 5,562,839 | 10/1996 | Pan | 216/26 |

FOREIGN PATENT DOCUMENTS 2140930  12/1984  United Kingdom ............ 385/43

*Primary Examiner*—John D. Lee
*Assistant Examiner*—Ellen E. Kang
*Attorney, Agent, or Firm*—Limbach & Limbach L.L.P.

[57] ABSTRACT

A composite optical fiber including a first optical fiber having a first core with a first diameter being optically fused to a second optical fiber having a second core with a second diameter that is smaller than the first diameter. The first optical fiber has an output end with a tapered end section. The first core tapers down in diameter in the tapered end section from the first diameter and terminates at the output end with a third diameter that is smaller than the first diameter and substantially equal to or smaller than the second diameter. The second fiber has an input end that is optically fused to the output end of the first fiber. The composite optical fiber of the present invention is formed by heating the output end of the first optical fiber, and then pulling the output end of the first optical fiber to form the tapered end section. The output end of the first optical fiber is then optically fused to the input end of the second optical fiber.

18 Claims, 2 Drawing Sheets

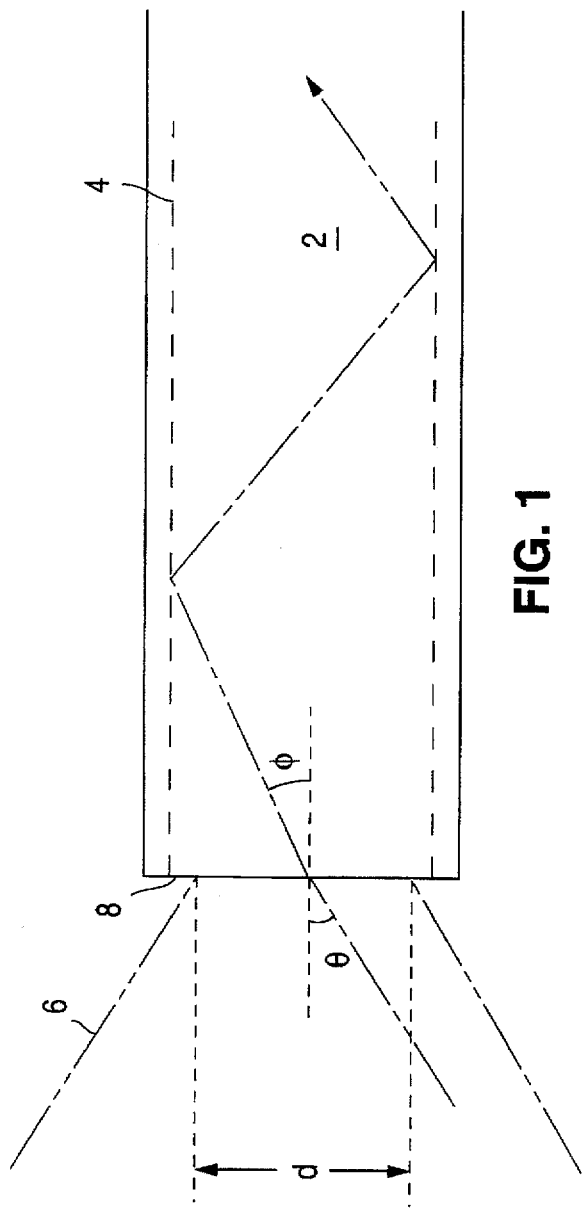
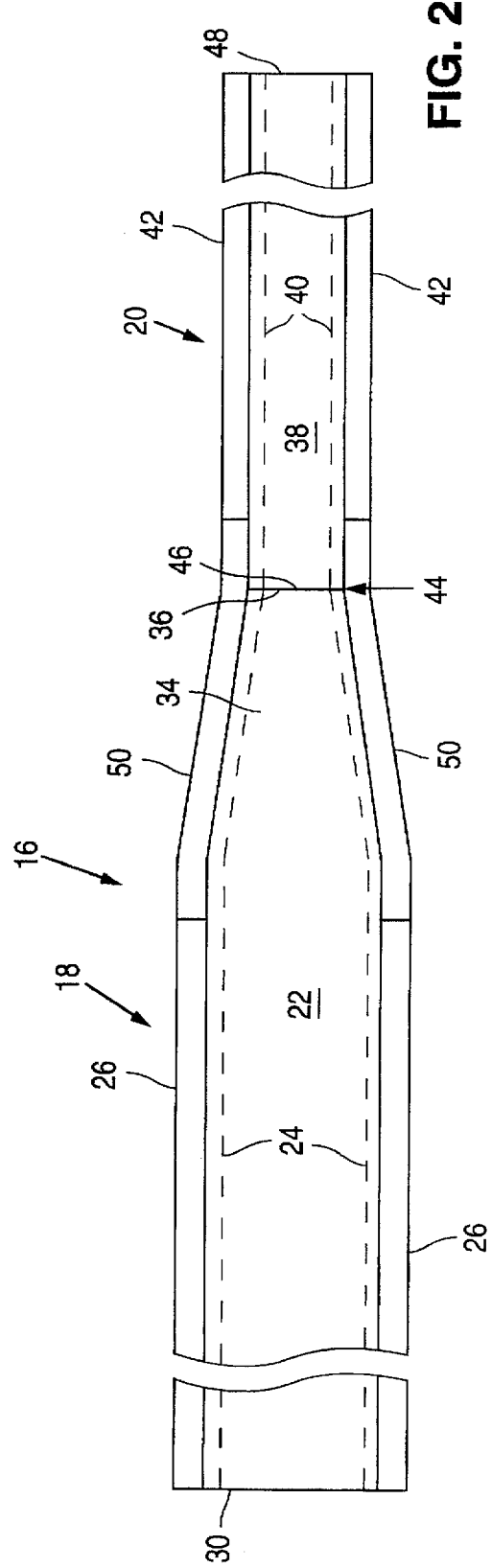

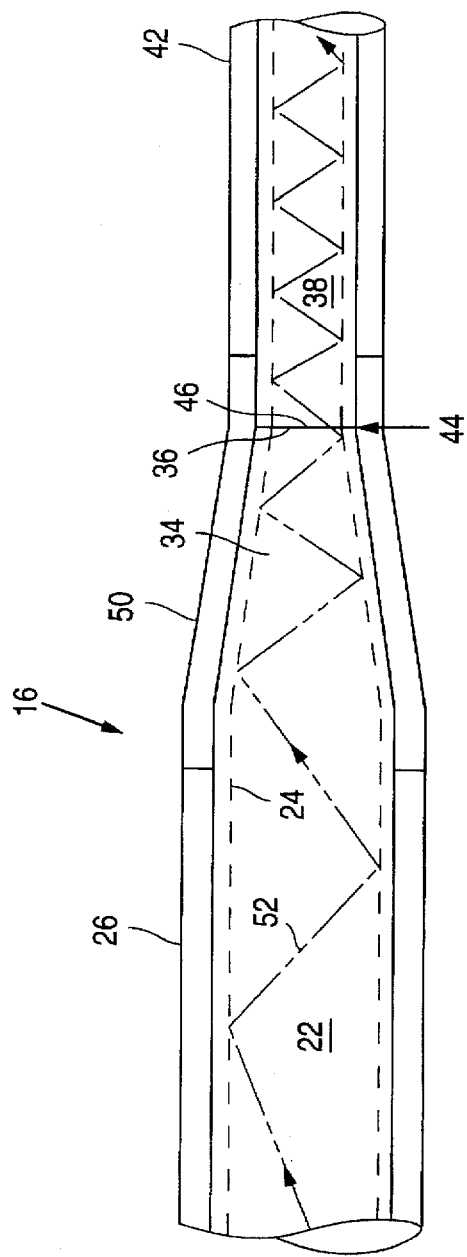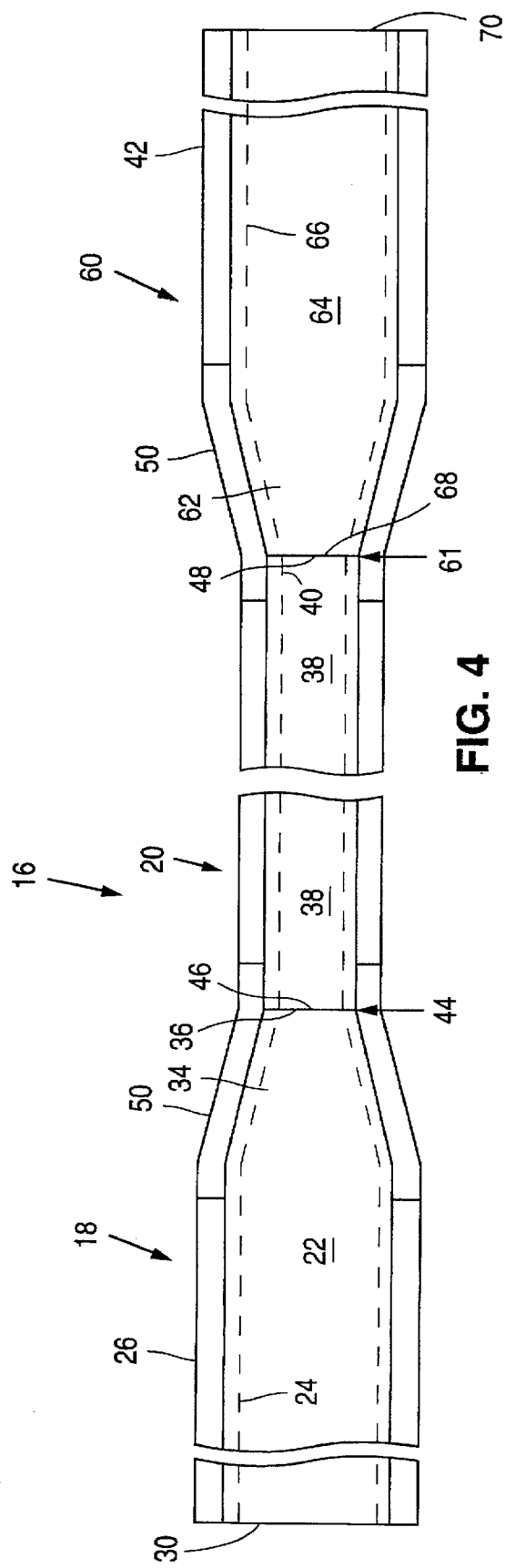

TAPERED COMPOSITE OPTICAL FIBER AND METHOD OF MAKING THE SAME

This is a continuation of Ser. No. 08/628,269 filed on Apr. 5, 1996 now abandoned.

FIELD OF THE INVENTION

The present invention relates to optical fibers, and in particular to medical optical fibers used to deliver optical energy to targeted tissue within a patient.

BACKGROUND OF THE INVENTION

It is well known to use optical fibers to deliver optical energy from a laser system to targeted tissue on or within a patient. For example, it is known to insert a urethroscope through the bladder and into the kidney of a patient where an optical fiber contained in a channel of the urethroscope delivers optical energy to break up the kidney stones. It is also known that smaller diameter optical fibers are preferred in such procedures because smaller diameter fibers take up less space in the channel of the urethroscope, are easier to deflect, and can tolerate a smaller bend radius without leaking light or being damaged which results in better maneuverability.

Coupling optics are used on the laser system's output beam to focus the beam down to a predetermined spot size (having diameter d) at the input end of the fiber to couple the beam into the fiber. The parameters of the focused beam as it enters the optical fiber, such as the spot size (d) and divergence, are typically referred to as the launch conditions of the beam, which are illustrated in FIG. 1. The optical fiber consists of a core 2 surrounded by a cladding 4. A laser beam 6 is focused into the input end 8 of the fiber where it propagates down the fiber by reflecting off of the core/cladding interface by total internal reflection (TIR). The laser beam must be focused into the fiber such that the spot size (d) is equal to or smaller than the fiber's core diameter, and that the propagating beam in the fiber does not strike the core/cladding interface below the critical angle such that light leaks out the sides of the fiber. This concept is best expressed in terms of the launch NA (numerical aperture) of the laser light and the intrinsic NA of the fiber. Let $\Theta$ represent the highest angle of incidence that light within the beam enters the fiber. The launch NA is defined as $\sin \Theta$, and the intrinsic NA of the fiber is defined as $(n^2_{core} - n^2_{cladding})^{1/2}$, where $n_{core}$ and $n_{cladding}$ are the refractive indices of the core and the cladding, respectively. In order to prevent loss out the core's sides, the launch NA must be equal to or less than the fiber's intrinsic NA, or $$\sin \Theta \leq (n^2_{core} - n^2_{cladding})^{1/2} \quad (1)$$

Reducing the diameter of the fiber's core necessitates that the beam be focused down to a smaller spot size (d) at the fiber's input end to properly couple the beam into the fiber. Focusing the beam down to a smaller spot size (d) results in $\Theta$ becoming larger (higher focusing angle to achieve the small spot size). In addition, the smaller spot size results in an increased power density at the air/glass interface at the input end 8 of the fiber. Given a particular fiber material (where $n_{core}$ and $n_{cladding}$ are known), $\Theta$ cannot exceed a particular value. Further, the closer the launch NA of the focused beam is to the intrinsic NA of the fiber, the less the fiber can be bent without leaking light out the fiber's sides. The fiber material will also dictate how much power can safely be transmitted through the fiber. Lastly, the higher the power density at the air/glass interface, the greater the likelihood that contamination or irregularities at this air/glass interface will cause optical damage to the input end 8 of the fiber. Therefore, given all the above considerations, there is a practical limit on how small the spot size and fiber diameter can be for a particular application.

Another consideration in determining what spot size and fiber diameter should be used is the divergence of the beam as it exits the fiber. The higher $\Theta$ becomes, the more divergent the beam becomes as it exits the output end of the fiber. Therefore, the launch conditions and fiber dimensions are selected to provide the desired divergence at the end of the fiber.

Many laser manufacturer's have developed and marketed laser systems that incorporate coupling optics for use with a predetermined fiber having a particular core diameter and intrinsic NA. For example, the present assignee markets a holmium based medical laser system under the tradename Versapulse Select which produces a 60–80 Watt beam with an output wavelength of 2.1 µm. The beam is focused to a spot size of about 220–240 µm at the point it enters the optical fiber. The optical fiber has a 365 µm diameter quartz core, a 400 µm diameter fluorine doped quartz cladding, a 430 µm diameter polymer based first buffer, and a 730 µm diameter tefzel based second buffer. The refractive indices, for light having a wavelength of 2.1 µm, are 1.44, 1.42, and 1.39 µm for the core, cladding and first buffer, respectively. Therefore, the fiber's intrinsic NA is 0.22. The coupling optics are designed in this laser system such that the launch NA is smaller than the 0.22 intrinsic NA of the fiber, thus satisfying equation 1.

Developing medical applications require small diameter fibers which are capable of traversing tortuous pathways through the body. These smaller diameter fibers, however, cannot be simply coupled to existing laser systems because the launch conditions of the output beam are not compatible with the smaller core diameters. In order to use these smaller diameter fibers on existing laser systems, not only must the coupling optics of these laser systems be retrofitted or replaced to properly couple the beam into the smaller fibers, but also the intrinsic NA of the fiber must be greater than the launch NA of the laser output beam. Replacing/retrofitting the coupling optics is costly each time the optical fiber diameter is reduced. Further, the smaller spot size results in an increased power density at the air/glass interface that increases the risk of optical damage to the fiber. In addition, it is harder to align coupling optics to smaller fibers.

One solution could be to re-focus the beam exiting the optical fiber into the input end of a second, smaller diameter fiber using a second focusing system. This would negate the need to retrofit the coupling optics in existing laser systems. However, such a configuration has several drawbacks. Specifically, adding an additional optical system increases costs and adds optical elements to the delivery system which must be routinely cleaned and aligned. Additional optical elements introduce aberrations and reflective losses which reduce brightness and transmission, respectively. Further, the launch NA going into the smaller fiber would be higher than the launch NA had the beam been originally focused into the smaller fiber because the original spot size of the beam when focused into the first fiber is typically smaller than the core diameter of the first fiber (for efficient coupling). The beam propagating through the first fiber expands to fill the core of the fiber before exiting into the refocusing optical system, thus resulting in an even higher $\Theta$ necessary to attain the proper spot size for entering the smaller second fiber. In addition, there would be an increased power density at the air/glass interface at the input end of the second fiber (compared with the power density at the input end of the first fiber), thus increasing the risk of optical failure at this interface.

There is a need for an optical fiber delivery system that can utilize smaller diameter fibers without having to change the laser system's coupling optics, and without adding additional optical coupling systems to refocus the beam from one fiber into another smaller fiber.

SUMMARY OF THE INVENTION

The present invention solves the above mentioned problems by providing a composite optical fiber with a core diameter at the input end that is larger than the core diameter at the output end. The composite fiber that negates the need to retrofit or replace laser system coupling optics, or to add additional optical systems, or to increase the optical density at the air/glass interface, in order to take advantage of a smaller diameter fiber segment at the output end of the composite fiber. Further, the larger core diameter at the input end of the composite fiber is more compatible with higher order mode lasers than if the coupling optics were reconfigured to focus the beam directly into the smaller diameter optical fiber.

The composite optical fiber of the present invention includes a first optical fiber having a core. The core has a main body and a tapered end section that terminates in an output end. The output end has a diameter that is smaller than the diameter of the main body. A second fiber has a second core with a diameter that is substantially equal to or greater than the diameter of the output end of the first core. The second fiber has an input end that is optically fused to the output end of the first fiber.

The composite optical fiber of the present invention is formed by heating the output end of the first optical fiber, and then pulling the output end of the first optical fiber to form the tapered end section wherein the core of the first optical fiber terminates at the output end with a second diameter that is smaller than the first diameter. The output end of the first optical fiber is then optically fused to the input end of the second optical fiber.

Other objects and features of the present invention will become apparent by a review of the specification, claims and appended figures.

BRIEF DESCRIPTION OF THE DRAWINGS

FIG. 1 is a cross-sectional view of the launch conditions of an optical beam into an optical fiber.

FIG. 2 is a cross-sectional view of the composite optical fiber of the present invention.

FIG. 3 is a cross-sectional view of the composite optical fiber illustrating the propagation of a beam through the fiber.

FIG. 4 is a cross-sectional view of a composite optical fiber having three fiber segments and two optical fused interfaces.

DETAILED DESCRIPTION OF THE PREFERRED EMBODIMENTS

The present invention is a method of tapering down and optically fusing two fibers together to form a single composite fiber having a larger core diameter at the input end and a smaller core diameter at the delivery end. Such a composite fiber avoids the need to modify the coupling optics of existing laser systems, or the need to use expensive or complicated coupling optics between the fibers, in order to take advantage of newer smaller diameter, high intrinsic numerical aperture, fibers as they are developed. The composite optical fiber 16 of the present invention includes first and second optical fiber segments 18 and 20 that are optically fused together, as illustrated in FIGS. 2–3.

First optical fiber 18 includes a core 22, surrounded by a cladding 24 and a buffer 26. The fiber 18 has an input end 30 which connects to the laser system (not shown), and a tapered section 34 which terminates in an output end 36. In the tapered section, the diameters of the core 22 and cladding 24 are tapered down in size until they reach a minimum value at the output end 36. Buffer 26 terminates before, and does not surround, the tapered section 34. The buffer adds mechanical strength to the fiber, seals the fiber cladding to prevent the ingress of water, and helps contain the light within the fiber when the fiber is significantly bent.

The second optical fiber 20 includes a core 38, surrounded by a cladding 40 and a buffer 42. Fiber 20 has an input end 46 and a delivery end 48. The diameters of the core 38 and the cladding 40 of fiber 20 are equal to the diameters of the tapered core 22 and cladding 24 at the output end 36 of fiber 18. The buffer 42 does not fully extend to the input end 46 of fiber 20. A protective layer 50 surrounds the exposed portions of claddings 24 and 40 between the ends of buffers 26 and 42.

The output end 36 of fiber 18 is optically fused to the input end 46 of fiber 20 so that light traveling down fiber 18 is coupled into fiber 20, as illustrated in FIG. 3. Light beam 52 propagating down fiber 18 encounters tapered section 34 which reduces the overall diameter of beam 52 before it enters fiber 20. So long as the numerical aperture of the propagating beam at any point in the tapered section or fiber 20 does not exceed the corresponding intrinsic numerical aperture, light will not leak out the sides of the fibers 18/20. It should be noted that if light does leak out through the core/cladding junction, it still can be contained by the cladding/buffer junction or the cladding/protective layer junction, so long as the propagating NA of the beam does not exceed an intrinsic numerical aperture that is defined by the refractive indices of the core/cladding and the buffer.

To form the tapered section 34, buffer 26 is stripped off from cladding 24 a predetermined length from the output end 36 of fiber 18. Then, heat is evenly applied to that predetermined length, while the output end 36 of the fiber is pulled, to form tapered section 34. The amount of heat applied must be sufficient to raise the core 22 and cladding 24 above their respective melting temperatures so that they will stretch, thus resulting in a longer, but narrower, section of fiber. A simple method of pulling the fiber is to mount a small weight (a few ounces) to the output end 36 of the fiber while the predetermined length is being heated. The heat is applied evenly to form a tapered section 34 that is straight and evenly tapers down to smaller diameters over its length. The heating and pulling of the fiber continues until the desired core diameter at the output end 36 is achieved. Ideally, the fiber is heated and pulled until a core diameter is achieved that is slightly smaller than the desired value. Thereafter, the output end 36 of the fiber 18 is cleaved and polished back to achieve the actual desired core diameter value. Any conventional heat source can be used, such as a torch, a laser source, etc.

The length of the tapered section 34 and the diameter of the core at the output end 36 are such that, given the refractive indices of the materials used to make the core/cladding, and the optical properties of the propagating beam, the numerical aperture of the propagating beam does not exceed the intrinsic numerical aperture of the tapered section 36 or fiber 20.

To connect fiber 18 to fiber 20, the buffer 42 is stripped back from the input end 46 of fiber 20. The fibers 18/20 are positioned such that output end 36 abuts input end 46 to define an interface 44 between the fibers 18/20. The fibers are aligned to maximize optical throughput through interface 44. The optical throughput is ideally measured by sending light through fiber 18 and measuring the light intensity exiting fiber 20.

A fusion splicer (not shown) is then used to optically fuse output end 36 to input end 46. A fusion splicer typically has two opposing electrodes that are placed across interface 44 to heat the output/input ends 36/46 beyond the melting temperatures of cores 22/38 and claddings 24/40, whereby the two fibers are then permanently fused together. Best results are achieved if the fusion splicer is aligned slightly on the tapered section side of interface 44 because the output end 36 of fiber 18 has a slightly higher heat capacitance than the input end 46 of fiber 20. It has also been found that slightly reheating the interface after it initially cools reduces stress between the fibers. While fibers 18 and 20 can be made of different materials, it is preferable these fibers be made of the same materials. If multiple materials are involved, and the melting temperatures of these materials are significantly different from each other, it may be difficult to melt the cores/claddings and achieve a good fusion between these fibers with optimally high optical transmission properties.

A protective layer 50 is placed over the exposed claddings 24/40 adjacent the fused interface 44. The protective layer extends between, and makes a seal with, buffers 26 and 42. The protective layer 50 provides mechanical support for the fused interface 44, keeps water away from the exposed claddings 24/40, and helps prevent any light from leaking out the sides of the fibers.

The fused interface 44 can be located anywhere along the length of the composite optical fiber 16 of the present invention. However, since the cost per unit length of fiber 20 in most cases will be cheaper than fiber 18 (because there is less volume of material per unit length), it would be preferable and least expensive to make fiber 18 as short as possible. In fact, the entire length of fiber 18, the taper section 34 and the fused interface 44 can be encased in a single optical connector, such as an SMA connector, used to couple the composite optical fiber 16 to the laser system.

Due to manufacturing tolerance constraints, it is ideal to make the diameter of core 22 at interface 44 slightly less than the diameter of core 38. In practice, this ensures optimal coupling of light through interface 44 by reducing the risk of inadvertently making core 22 slightly larger than core 38, which would induce an undesirable coupling loss for light travelling from fiber 18 to fiber 20 through interface 44. If core 22 has a slightly smaller diameter at interface 44 than the diameter of core 38, the beam 52 will simply expand to fill core 38 after it enters fiber 20.

The present assignee has successfully implemented the composite optical fiber 16 of the present invention on its Holmium based laser system described above, which was designed with coupling optics compatible with a 365 µm core diameter fiber. The composite optical fiber 16 comprises a fiber 18 having a 365 µm diameter germanium oxide doped quartz core, a 438 µm diameter pure silica cladding, a 465 µm diameter HCS polymer based first buffer, and a 730 µm diameter tefzel based second buffer. The refractive indices, for light having a wavelength of 2.1 µm, are approximately 1.47, 1.44, and 1.39 for the core, cladding and first buffer, respectively, resulting in an intrinsic NA of 0.29. The tapered section is about 0.25 inches in length, and the 365 µm core is tapered down to 252 µm at the output end 36. A fiber 20 of the same materials is optically fused to the tapered end of fiber 18, and has a 252 µm diameter core, a 302 µm diameter cladding, a 330 µm diameter first buffer, and a 400 µm diameter second buffer. The protective layer 50 is made of silicone and forms a seal around the exposed portions of claddings 24 and 40 extending between the ends of the first and second buffers of fibers 18 and 20. The entire length of fiber 18 (0.65 inches including the 0.25 inch tapered section) and the optically fused interface is encased inside an SMA connector that attaches to the laser system. The original launch NA of the laser system is about 0.19, which, after the taper becomes a propagating NA of about 0.28, which is less than the 0.29 intrinsic NA of the fibers 18/20. The coupling optics of the holmium laser system need not be retrofitted or replaced to accommodate the smaller 252 µm fiber because of the higher intrinsic NA of this composite fiber.

In actuality, only a small portion of the above described beam has a propagating NA of 0.28, with most of the beam having a propagating NA far below 0.28. However, since a portion of the beam does have a propagating NA near the intrinsic NA 0.29 of the fibers, the buffer materials are selected to contain that portion of beam within the fiber while the fiber is bent at sharp angles.

The composite optical fiber 16 can also be used in the reverse direction, with light input through end 48 of fiber 20 and exiting end 30 of fiber 18. In such a case, fiber 20 would be dimensioned for proper coupling of the beam from the laser's coupling optics into end 48. The expanding taper section 34 for such a light beam would result in expanding the spot size of the propagating beam, while narrowing the divergence of the propagating beam, before it exits the fiber's end 30. This expanding taper is ideal for those applications which require a larger diameter beam with reduced divergence. This embodiment is advantageous for longer composite fibers because a larger diameter fiber would be more expensive than a narrower fiber having an expanding taper on one end. In addition, the smaller fibers are easier to deflect making them better suited for traversal of tortuous interbody pathways, and are more difficult to break when bent into a smaller bend radius. It should be noted that if the composite fiber 16 is used in this reverse direction, the diameter of the tapered core 22 at interface 44 should not be made smaller than the diameter of core 38, as suggested above.

Another embodiment of the composite optical fiber 16 is illustrated in FIG. 4, which is the same as the embodiment in FIGS. 2 and 3, except a third fiber segment 60 is optically fused to the output end 48 of fiber 20 at a second interface 61. The third fiber 60 has a tapered section 62 where the diameters of the core/cladding 64/66 at an input end 68 match the diameters of the core/cladding 38/40 of fiber 12 at output end 48. This composite fiber configuration results in a traversing beam being reduced to a smaller diameter by the first tapered section 34, and being expanded to a larger diameter by the second tapered section 62. The diameter of fiber 60 need not be equal to the diameter of fiber 18. Therefore, this embodiment has the advantage of having the diameter of input end 30 optimized for the coupling optics of the laser system, the diameter of output end 70 optimized to produce the desired beam diameter and divergence, and the middle section (fiber 20) having a reduced diameter for cost savings and improved deflection and size characteristics.

It is to be understood that the present invention is not limited to the embodiments described above and illustrated herein, but encompasses any and all variations falling within the scope of the appended claims. For example, the optical fiber delivery device is not limited to medical applications, to holmium lasers, or to the exact intrinsic numerical apertures described above. Further, it is not critical if 1 or 2 buffers are used around claddings 24/40.

What is claimed is:

1. A composite optical fiber, comprising:

a first optical fiber having a first core made of a first core material surrounded by a first cladding made of a first cladding material, said first core and cladding having a main body and a tapered end section that terminates in an output end, with the output end having first core and cladding diameters that are smaller than the first core and cladding diameters respectively of the main body; and a second fiber having a second core made of a second core material surrounded by a second cladding made of a second cladding material with second core and cladding diameters that are substantially equal to or greater than the first core and cladding diameters respectively of the output end of the first optical fiber, but are less than the first core and cladding diameters respectively of the first optical fiber main body, and having an input end that isoptically fused to the output end of the first fiber:

wherein each of said first and second fibers having an intrinsic numerical aperture of at least 0.29 as defined by: $(n^2_{core} - n^2_{cladding})^{1/2}$, where $n_{core}$ is the refractive index of the fiber core material for light having a wavelength of 2.1 um, and $n_{cladding}$ is the refractive index of the fiber cladding material for light having a wavelength of 2.1 um.

2. The composite optical fiber of claim 1, further comprising:

a first buffer surrounding the first cladding that terminates before the tapered end section of the first fiber;

a second buffer surrounding the second cladding that terminates before the input end of the second fiber; and a protective layer surrounding the first and second claddings and extending from the first buffer to the second buffer.

3. The composite optical fiber of claim 2, wherein the first and second fibers are made of the same materials.

4. The composite optical fiber of claim 3, wherein the first and second cores are made of germanium oxide doped quartz, and the first and second claddings are made of pure silica.

5. The composite optical fiber of claim 1, further comprising:

a third optical fiber having a third core surrounded by a third cladding, said third core and cladding having a second main body and a second tapered end section that terminates in a second input end, with the second input end having third core and cladding diameters that are smaller than the third core and cladding diameters respectively of the second main body, wherein said second core and cladding diameters of said second fiber being substantially equal to or less than the third core and cladding diameters respectively of the second input end of the third optical fiber, said second fiber having an output end that is optically fused to the second input end of the third fiber.

6. A method of forming a composite optical fiber, comprising the steps of:

heating an output end of a first optical fiber having a first core made of a first core material with a first core diameter surrounded by a first cladding made of a first cladding material with a first cladding diameter;

pulling the heated output end of the first optical fiber to form a tapered end section of the first optical fiber wherein the first core and cladding terminate at the output end with a second core diameter and a second cladding diameter that are smaller than the first core diameter and first cladding diameter respectively; and optically fusing the output end to an input end of a second optical fiber that has a second core made of a second core material with a third core diameter surrounded by a second cladding made of a second cladding material with a third cladding diameter, the third core and cladding diameters are substantially equal to or greater than the second core and cladding diameters respectively, but are less than the first core and cladding diameters respectively, of the first optical fiber:

wherein each of said first and second fibers having an intrinsic numerical aperture of at least 0.29 as defined by: $(n^2_{core} - n^2_{cladding})^{1/2}$, where $n_{core}$ is the refractive index of the fiber core material for light having a wavelength of 2.1 um, and $n_{cladding}$ is the refractive index of the fiber cladding material for light having a wavelength of 2.1 um.

7. The method of claim 6 further comprising the step of:

stripping back a first buffer surrounding the first fiber away from the output end before the heating step.

8. The method of claim 7 further comprising the step of:

cleaving the output end of the first fiber before the optically fusing step.

9. The method of claim 7 further comprising the step of:

polishing the output end of the first fiber before the optically fusing step.

10. The method of claim 7 further comprising the step of:

cleaving and polishing the output end of the first fiber before the optically fusing step.

11. The method of claim 7 further comprising the step of:

forming a protective layer around the tapered section of the first fiber.

12. The method of claim 6 further comprising the steps of:

heating an input end of a third optical fiber having a third core with a fourth core diameter surrounded by a third cladding with a fourth cladding diameter;

pulling the heated output end of the third optical fiber to form a tapered end section of the third optical fiber wherein the third core and cladding terminates at the input end of the third optical fiber with fifth core and cladding diameters that are smaller than the fourth core and cladding diameters respectively; and optically fusing the input end of the third fiber to an output end of the second optical fiber, wherein the third core and cladding diameters of the second core and cladding are substantially equal to or less than the fifth core and cladding diameters respectively of the third optical fiber.

13. A method of forming a composite optical fiber that includes a first optical fiber having a first core made of a first core material with a first core diameter surrounded by a first cladding made of a first cladding material with a first cladding diameter and a first buffer, and a second optical fiber having a second core made of a second core material with a second core diameter surrounded by a second cladding made of a second cladding material with a second cladding diameter and a second buffer, the first core and cladding diameters are greater than the second core and cladding diameters respectively, the first fiber having an output end and the second fiber having an input end, each of said first and second fibers having an intrinsic numerical aperture of at least 0.29 as defined by: $(n^2_{core} - n^2_{cladding})^{1/2}$, where $n_{core}$ is the refractive index of the fiber core material for light having a wavelength of 2.1 um, and $n_{cladding}$ is the refractive index of the fiber cladding material for light having a wavelength of 2.1 um, comprising the steps of:

heating the first optical fiber adjacent the output end;

pulling the heated output end of the first optical fiber to form a tapered end section wherein the first core and cladding terminate at the output end with third core and cladding diameters that are smaller than the first core and cladding diameters respectively and substantially equal to or less than the second core and cladding diameters respectively of the second optical fiber; and optically fusing the output end of the first optical fiber to the input end of the second optical fiber.

14. The method of claim 13 further comprising the steps of:

stripping back a portion of the first buffer adjacent to the output end of the first fiber; and stripping back a portion of the second buffer adjacent to the input end of the second fiber.

15. The method of claim 14 further comprising the steps of:

cleaving the output end of the first fiber before the optically fusing step.

16. The method of claim 14 further comprising the steps of:

polishing the output end of the first fiber before the optically fusing step.

17. The method of claim 14 further comprising the steps of:

cleaving and polishing the output end of the first fiber before the optically fusing step.

18. The method of claim 14 further comprising the step of:

forming a protective layer around the tapered section of the first fiber.

* * * * *